United States Patent [19]

Freund et al.

[11] Patent Number: 5,819,247

[45] Date of Patent: Oct. 6, 1998

[54] APPARATUS AND METHODS FOR MACHINE LEARNING HYPOTHESES

[75] Inventors: Yoav Freund, Hoboken; Robert Elias Schapire, Maplewood, both of N.J.

[73] Assignee: Lucent Technologies, Inc., Murray Hill, N.J.

[21] Appl. No.: 902,106

[22] Filed: Jul. 29, 1997

Related U.S. Application Data

[63] Continuation of Ser. No. 386,034, Feb. 9, 1995, abandoned.
[51] Int. Cl.$^6$ ..................................................... G06F 15/18
[52] U.S. Cl. ................................................ 706/25; 706/26
[58] Field of Search ....................................... 395/23, 24

[56] References Cited

U.S. PATENT DOCUMENTS 5,479,575  12/1995  Yoda ........................................ 395/24

OTHER PUBLICATIONS

H. Drucker, R. Schapire, P.Simard, "Boosting Performance in Neural Networks", *International Journal of Pattern Recognition and Artificial Intelligence*, vol. 7, No. 4 (1993) 705–719.

R. Schapire, "The Strength of Weak Learnability", *Machine Learning*, 5, 197–227 (1990).

Y. Freund, "Boosting a Weak Learning Algorithm by Majority", *Proceedings of the Third Annual Workshop on Computational Learning Theory*, Aug. 6–8, 1990.

H. Drucker, C. Cortes, L. D. Jackel, Y. LeCun, V. Vapnik, "Boosting and Other Machine Learing Algorithms", *Machine Learning, Proceedings of the Eleventh International Conference*, Jul. 10–13, 1994.

J. Jackson, "An Efficient Membership–Query Algorithm for Learning DNF with Respect to the Uniform Distribution", *Proceedings of the 35th Annual Symposium on Foundations of Computer Science*, Nov. 20–22, 1994.

Zhang, B–T., "Selecting a Critical Subset of Given Examples during Learning", ICANN '94 Proc. of Int'l. Conf. on Artificial Neural Networks, Sorrento, Italy, 26–29 May 1994, ISBN 3–540–19887–3, Springer–Verlag, Berlin, Germany, pp. 517–520, vol. 1.

EP–A–0 463 630 (Digital Equipment Corp.) 2 Jan. 1992 abstract.

EP–A–0 528 399 (Toyoda Machine Works Ltd) 24 Feb. 1993, p. 4, lines 14–57.

EP–A–0 591 921 (Matsushita Electric Ind Co. Ltd) 13 Apr. 1994, p. 6, line 13, p. 7, line 1.

Gathercole, C., et al., "Dynamic Training Subset Selection for Supervised Learning in Genetic Programming", Third Conf. on Parallel Problem Solving From Nature. Int'l Conf. on Evolutionary Computation, Jerusalem, Israel Oct. 1994, ISDN 3–540–58484–6, 1994, Springer–Verlag, Berlin, Germany, pp. 312–321 abstract.

*Primary Examiner*—Allen R. MacDonald
*Assistant Examiner*—Jeffrey S. Smith

[57] ABSTRACT

Apparatus and methods for machine learning the hypotheses used in the classifier component of pattern classification devices such as OCRs, other image analysis systems, and and text retrieval systems. The apparatus and methods employ machine learning techniques for generating weak hypotheses from a set of examples of the patterns to be recognized and then evaluate the resulting hypothesis against example patterns. The results of the evaluation are used to increase the probability that the examples used to generate the next weak hypothesis are ones which the previous weak hypothesis did not correctly classify. The results of the evaluation are also used to give a weight to each weak hypothesis. A strong hypothesis is then made by combining the weak hypotheses according to their weights.

26 Claims, 3 Drawing Sheets

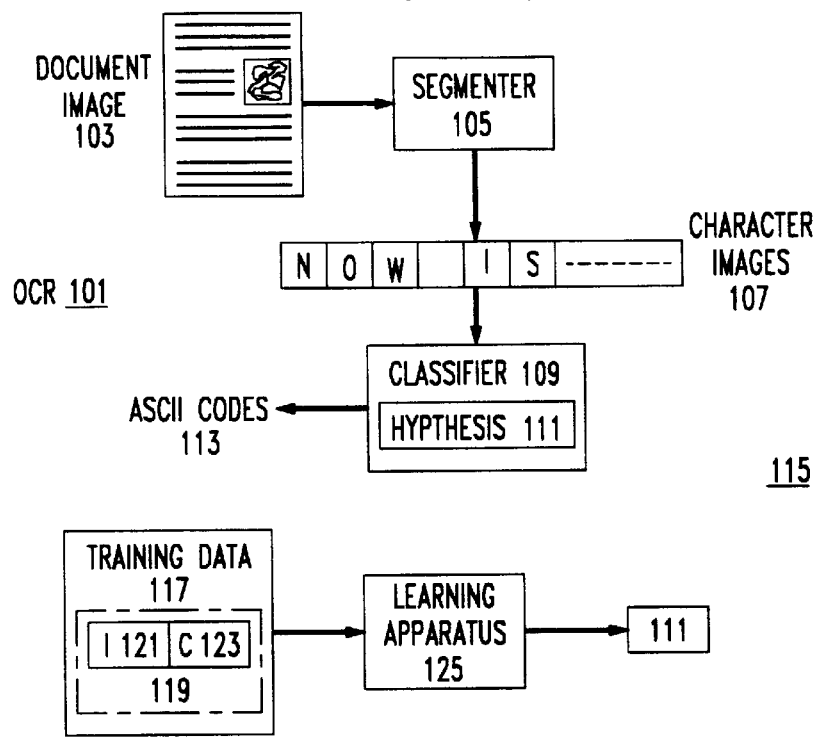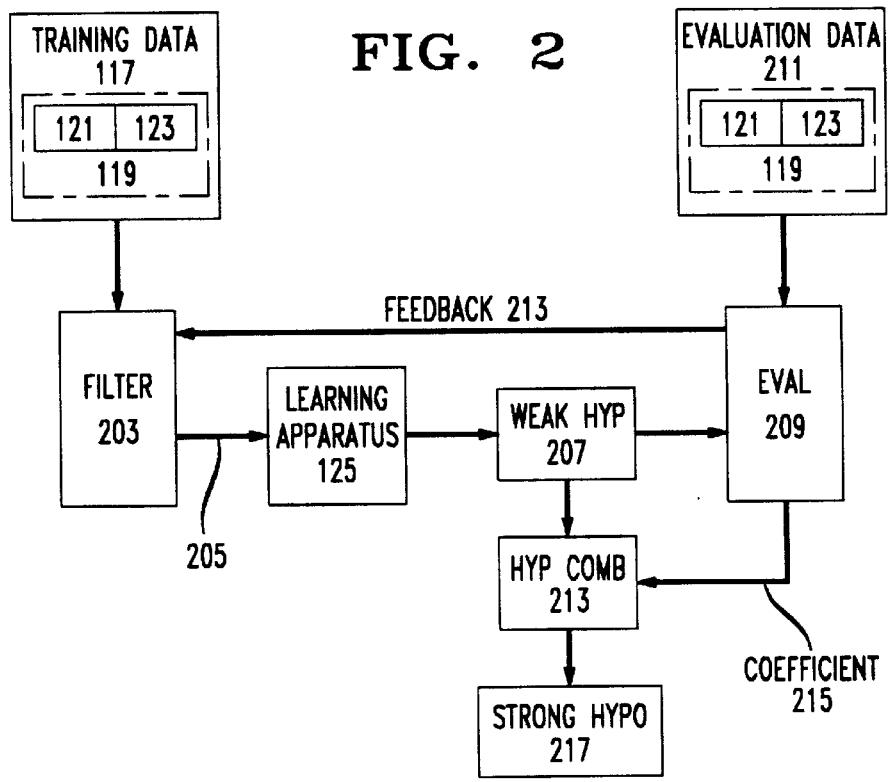

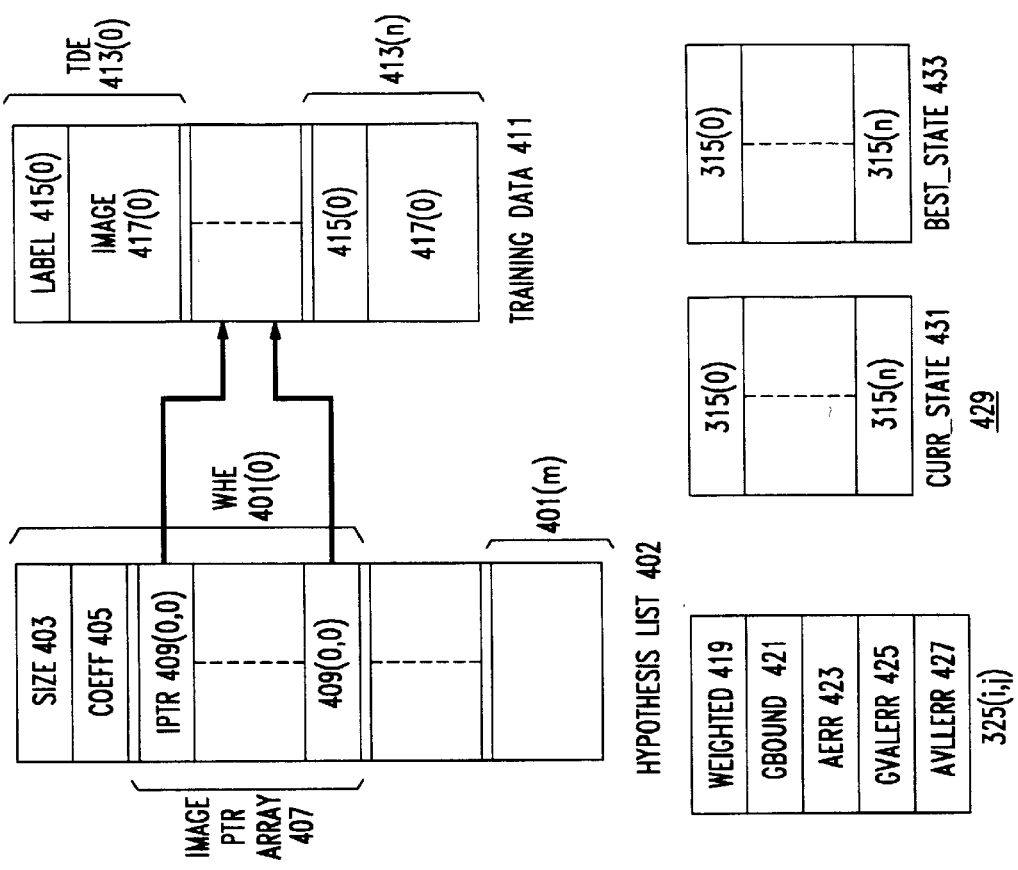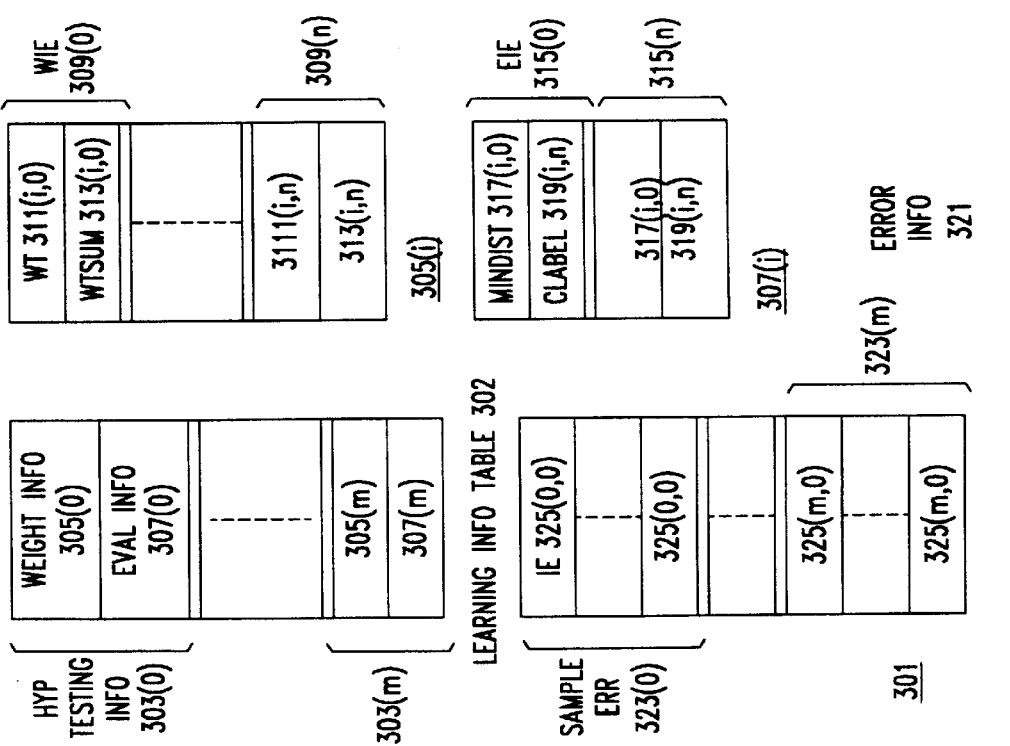

FIG. 5

Algorithm AdaBoost
Input: set of $N$ labeled examples $\{(1, c(1)), \ldots, (N, c(N))\}$
distribution $D$ over the examples
weak learning algorithm WeakLearn
integer $T$ specifying number of iterations Initialize the weight vector: $w_i^1 = i$ for $i = 1, \ldots, N$
Do for $t = 1, 2, \ldots, T$ 1. Set
$$p^t = \frac{w^t}{\sum_{i=1}^{N} w_i^t}$$

2. Call WeakLearn providing it with the distribution $p^t$; get back a hypothesis $h_t$.

3. Calculate the error of $h_t$: $\epsilon_t = \sum_{i=1}^{N} p_i^t |h_t(i) - c(i)|$.

4. Set $\beta_t = \epsilon_t/(1 - \epsilon_t)$.

5. Set the new weights vector to be
$$w_i^{t+1} = w_i^t \beta_t^{1-|h_t(i)-c(i)|}$$

Output the hypothesis
$$h_f(i) = \begin{cases} 1, & \sum_{t=1}^{T} \left(\log \frac{1}{\beta_t}\right) h_t(i) \geq \frac{1}{2} \sum_{t=1}^{T} \log \frac{1}{\beta_t} \\ 0, & \text{otherwise} \end{cases}$$

501

APPARATUS AND METHODS FOR MACHINE LEARNING HYPOTHESES

This is a Continuation of application Ser. No. 08/386,034 filed Feb. 9, 1995 now abandoned.

1 BACKGROUND OF THE INVENTION

1.1 Field of the Invention

The invention relates generally to machine learning techniques and relates specifically to boosting techniques for using a weak PAC-learning algorithm to make a strong hypothesis for use in a classifier.

1.2 Description of the Prior Art: FIG. 1

Much time and effort has been invested in systems which are designed to classify data, that is, to assign a label on the data which indicates what class it belongs to. One example of such a system is an optical character recognition (OCR) system, which takes a bit-map image of a document and produces a text file that contains a sequence of character codes corresponding to the text in the image.

FIG. 1 shows an OCR 101. OCR 101 takes bit-map document image 103, which includes text and may also include non-text material such as a picture. Image 103 first goes to segmenter 105, which segments the image into the parts which contain text and the parts which do not and then extracts bit-map images 107 of the individual characters making up the text. The images 107 then go to classifier 109 which determines which alphanumeric character each image 107 represents and outputs the corresponding character code 113 to the text file. The actual assignment of the character code 113 to the image is done by hypothesis 111, which is apparatus which, when given an image, decides what character code should be assigned to the image. There are various kinds of hypotheses. One kind is data which is specially adapted to determining what character code corresponds to an image, for example a set of bit maps which are chosen for their ability to determine what alphanumeric character an image 107 represents. The manner in which the bit-map image 107 being classified matches the bit maps in the hypothesis determines what character code is assigned to it. Another kind is one or more neural networks which have been trained to determine what character code corresponds to an image.

In recent years, machine learning techniques have been used to produce hypotheses used in classifiers. An example of a system employing such techniques is shown at 115 in FIG. 1. The data used to produce the hypothesis is in training data 117. Each item of training data 119 is made up of an example of the data to be classified and the proper label for the example. Thus, in the case of hypotheses for OCRs, training data 119 consists of images 121 of alphanumeric characters together with the corresponding character code 123. The training data is supplied to learning apparatus 125, which derives hypothesis 111 from the labelled data.

One class of machine learning techniques which have been used to produce hypotheses is termed the PAC learning model, which can be summarized as follows: Let X be a set called the domain. A concept is a Boolean function $c:X \to \{0, 1\}$. A concept class C is a collection of concepts. The learner has access to an oracle which provides labeled examples of the form $(x, c(x))$ where x is chosen randomly according to some fixed but unknown and arbitrary distribution D on the domain X, and $c \in C$ is the target concept. After some amount of time, the learner must output a hypothesis $h:X \to [0,1]$. The error of the hypothesis h is the expected value $E_{x \sim D(x)} -c(x)|)$ where x is chosen according to D.

A strong PAC-learning algorithm is an algorithm that, given $\epsilon, \delta > 0$ and access to random examples, outputs with probability $1-\delta$ a hypothesis with error at most $\epsilon$. Further, the running time must be polynomial in $1/\epsilon$, $1/\delta$ and other relevant parameters (namely, the "size" of the examples received, and the "size" or "complexity" of the target concept). A weak PAC-learning algorithm satisfies the same conditions but only for $\epsilon \geq \frac{1}{2} - \gamma$ where $\gamma > 0$ is either a constant, or decreases as $1/p$ where p is a polynomial in the relevant parameters.

One of the inventors of this patent showed that any weak learning algorithm can be efficiently transformed or "boosted" into a strong learning algorithm. See Robert E. Schapire, "The strength of weak learnability" in: *Machine Learning*, 5(2): 197–227, 1990. Later, the other inventor presented a "boost-by-majority" algorithm that is considerably more efficient than Schapire's algorithm. See Yoav Freund, *Data Filtering and Distribution of Modeling Algorithms for Machine Learning*, Ph.D thesis, University of California at Santa Cruz, 1993. Both algorithms work by calling a given weak learning algorithm WeakLearn multiple times, each time presenting it with a different distribution over the domain X, and finally combining all of the generated hypotheses into a single hypothesis. The intuitive idea is to alter the distribution over the domain X in a way that increases the probability of the "harder" parts of the space. An example of how the foregoing boosting techniques can be used to produce neural network hypotheses may be found in Harris Drucker, et al., "Boosting Performance in Neural Networks", *International Journal of Pattern Recognition and Artificial Intelligence*, vol. 7, no. 4 (1993), pp. 705–719.

A deficiency of the boost-by-majority algorithm is the requirement that the bias $\gamma$ of the weak learning algorithm WeakLearn be known ahead of time. Not only is this worst-case bias usually unknown in practice, but the bias that can be achieved by WeakLearn will typically vary considerably from one distribution to the next. Unfortunately, the boost-by-majority algorithm cannot take advantage of hypotheses computed by WeakLearn with error significantly smaller than the presumed worst-case bias of $\frac{1}{2} - \gamma$.

It is an object of the invention disclosed herein to provide learning apparatus and methods which provide strong hypotheses that depend on the accuracy of all of the hypotheses returned by WeakLearn and which are easily able to handle real-valued hypotheses of the type produced by neural networks and other learning algorithms.

2 SUMMARY OF THE INVENTION

The invention overcomes the above disadvantages by using feedback from evaluations of the weak hypotheses produced by the Weaklearn algorithm to bias selection of samples to be incorporated in the weak hypothesis in favor of samples for patterns which the weak hypothesis has difficulty classifying. In another aspect, the invention also uses the evaluations of the weak hypotheses to compute coefficients for the weak hypotheses which indicate how much weight is to be given each weak hypothesis when it is combined with other weak hypotheses to make a strong hypothesis.

Other objects and advantages of the apparatus and methods disclosed herein will be apparent to those of ordinary skill in the art upon perusal of the following Drawing and Detailed Description, wherein:

3 BRIEF DESCRIPTION OF THE DRAWING

FIG. 1 contains a block diagram of an OCR using a hypothesis and a block diagram of a prior-art system for learning hypotheses;

FIG. 2 is a block diagram of an embodiment of the invention;

FIG. 3 is a block diagram of data structures employed in a preferred embodiment;

FIG. 4 is another block diagram of data structures employed in a preferred embodiment; and FIG. 5 is a high-level representation of the algorithm implemented in the preferred embodiment.

Reference numbers in the Drawing have two parts: the two least-significant digits are the number of an item in a figure; the remaining digits are the number of the figure in which the item first appears. Thus, an item with the reference number 201 first appears in FIG. 2.

4 DETAILED DESCRIPTION OF THE PREFERRED EMBODIMENT

The following Detailed Description will first provide an overview of the invention and will then provide a description of an exemplary embodiment thereof.

Overview of the Invention: FIGS. 2 and 5

FIG. 2 presents a block diagram overview of a preferred embodiment 201 of the invention. The preferred embodiment is used to develop a strong hypothesis for classifying images of the digits 0–9. As before, training data 117 contains data items 119, each of which includes an image 121 of a digit and a label 123 which is the character code corresponding to the digit. Filter 203 selects a subset 205 of the data items 119 which is particularly useful in deriving the hypothesis and provides those data items to learning apparatus 125, which employs a weak PAC learning algorithm to produce weak hypothesis 207 for the subset 205 of data items selected by filter 203. In the preferred embodiment, weak hypothesis 207 is a set of data items 119 from training data 117.

Weak hypothesis 207 is then evaluated in evaluator 209 using a set of evaluation data 211, which again contains data items 119 with images 121 of digits 0–9 and labels 123. The less an image in weak hypothesis 207 contributes to selecting the right label, the greater the weight given it by evaluator 209. As shown by feedback arrow 213, evaluator 209 provides the cumulative weight of the components of the last hypothesis 207 to be made to filter 203, where the weight is used to bias the selection of subset 205 against examples on which weak hypothesis 207 performed well. Moreover, the better the entire weak hypothesis does, the greater the importance it has for strong hypothesis 217 and the larger the coefficient given it by evaluator 209.

Coefficient 215 provided by evaluator 209 and weak hypothesis go to hypothesis combiner 213, where hypothesis 207 is combined with other hypotheses 207 produced the operation of learning apparatus 125 on other subsets 205 produced by filter 203 to produce strong hypothesis 217. In the preferred embodiment, strong hypothesis 217 is simply the set of weak hypotheses 207 produced by apparatus 201 from a fixed number of subsets 205 of training data 117, and the weak hypotheses are combined simply by giving each one a weight in the strong hypothesis which corresponds to its coefficient 215.

The technique employed in apparatus 201 to produce strong hypothesis 217 can be described formally as shown in FIG. 5. We call algorithm 501 of FIG. 5 AdaBoost because it adjusts adaptively to the errors of the weak hypotheses returned by WeakLearn. The algorithm has a main loop which is iterated T times. Each time it defines a distribution $p^t$ over X according to the current weight vector $w^t$. It then feeds this distribution to WeakLearn and gets back a hypothesis $h_t$ whose error is $\epsilon_t$. If WeakLearn is a weak learning algorithm in the sense defined above, then $\gamma_t \leq \frac{1}{2} - \gamma$ for all t; however, such a bound on the error need not be known ahead of time, and indeed, our results hold for any $\epsilon_t \epsilon\ (0,\frac{1}{2}]$.

The parameter $\beta_t$ is chosen as a function of $\epsilon_t$ and is used for updating the weight vector. The update rule reduces the probability assigned to those examples on which the hypothesis makes a good prediction and increases the probability of the examples on which the prediction is poor. Furthermore, if $h_t$ is Boolean (with range $\{0,1\}$), then it can be shown that this update rule exactly removes the advantage of the last hypothesis. That is, the error of $h_t$ on distribution $p^{t+1}$ is exactly $\frac{1}{2}$. The final hypothesis generated by the algorithm is a weighted average of the T hypotheses generated by WeakLearn.

Detailed Implementation of a Preferred Embodiment: FIGS. 3 and 4

The presently-preferred embodiment is a prototype implemented to test the effectiveness of the invention at boosting. The following discussion of the protype will first give an overview and then describe the data structures used in the prototype and the prototype's operation in detail.

Overview of the Prototype

The prototype is implemented by executing a program written in the well-known C language on a processor operating under the well-known UNIX (UNIX is a trademark of X OPEN) operating system.

The data for which the prototype is producing a strong hypothesis is images of the digits 0–9. The strong hypothesis is made up of a set of weak hypotheses which are weighted according to their predictive ability. Each weak hypothesis includes a coefficient indicating how it is to be weighted and a set of images of the digits 0–9.

In overview, the prototype program operates as follows: first, it creates a set of training data by reading images of the digits and labels for the digits in the images from files to the processor's memory. Then the prototype permutes the data 117 in memory and initializes a data structure which keeps track of the data involved in producing weak hypotheses.

Next, the prototype begins producing weak hypotheses. Each weak hypothesis is produced one image at a time. An image which is a candidate to be added to the current weak hypothesis selected from the training data in a fashion which takes into account the error which resulted when the training data was classified by the preceding weak hypothesis produced by the prototype. The selected candidate image thus has a high probability of being an image which the last weak hypothesis did not properly classify. The portion of the program which does the selection of the candidate image thus embodies filter 203 and the use of the error to select the candidate image embodies feedback 213.

Thereupon, the program determines whether the candidate image should be added to the weak hypothesis currently being built. To do this, the program tests whether the current weak hypothesis with the candidate image does a better job of classifying the images in the training data than the current weak hypothesis without the candidate image. If it does, the candidate image is added to the current weak hypothesis and the coefficient of the current weak hypothesis with the candidate image is computed from the error value for the new current weak hypothesis. The above procedure continues until the current weak hypothesis has its full complement of images.

In this implementation, the training data thus functions as both training data 117 and evaluation data 211. In other embodiments, separate sets of labelled images may be used for training data 117 and evaluation data 211. Evaluation component 209 is implemented by the parts of the program which evaluate the current weak hypothesis against the training data and compute the error for feedback 213 and coefficient 215.

The program makes a strong hypothesis simply by accumulating a set number of weak hypotheses. When an image is provided to the strong hypothesis, it is classified by each weak hypothesis and the final classification is determined by combining the classifications produced by the weak hypotheses. The weight which a classification produced by a given weak hypothesis has in the combination is determined by the coefficient of the given weak hypothesis.

Details of the Data Structures: FIGS. 3 and 4

Continuing in more detail with the data structures used in the preferred embodiment, the data structure used in the preferred embodiment to implement both training data 117 and evaluation data 211 is shown at 411 in FIG. 4. The data structure is a 1000-element array. Each element of the array contains label data 415 and image data 417. Image data 417 is a pixel image of a digit and label data 415 indicates which digit the pixel image represents. The data structure used to implement strong hypothesis 217 and the weak hypotheses 207 is shown at 402. Again, the data structure is an array with an element 401 for each weak hypothesis 207. In the preferred embodiment, each strong hypothesis is made up of 10 weak hypotheses. Each element 401 for a weak hypothesis 207 contains size 403, which specifies the number of images in the weak hypothesis, coeff 405, which is the coefficient of weak hypothesis 207 contained in element 401, and a list of pointers (iptr) 409 to the training data elements 413 in training data 411 which contain the labelled images that make up the hypothesis. In other embodiments, of course, the labelled images could be incorporated directly into the hypothesis or the pointers might point to a separate array of labelled images used in the hypotheses. In the preferred embodiment, a weak hypothesis 207 may contain up to 400 labelled images.

The data structures used in the preferred embodiment to make a weak hypothesis are the following: Learning information table 302, in FIG. 3, contains the results of testing the weak hypotheses against the images in training data 411. Error information 321 contains the errors that are computed for the tested weak hypotheses. current_state 431 and best_state 433, in FIG. 4, finally, are temporary arrays used in testing the current weak hypothesis with the candidate image against the images in training data 411. current_state holds the results of the last test made, while best_state holds the best results obtained so far for the current weak hypothesis.

Learning information table 302 contains hypothesis testing information 303 for each weak hypothesis 207. There are two parts of hypothesis testing information: weight information 305, which contains the information used to compute feedback 213, and evaluation information 307, which contains the results of testing the weak hypothesis against training data 411. Weight information 305 and evaluation information 307 are both implemented as arrays, with one element for each image in training data 411 that the hypothesis is tested against. Elements 309 of weight information 305 includes wt 311, which measures the success of the hypothesis in classifying the image and wtsum 313, which is the sum of the wts 311 for the elements of weight information 305 through the current element. The greater the value of wt 311, the poorer the classifying power of the hypothesis for the corresponding image in training data 411 and the greater the value of wtsum 313, the poorer the classifying power of the hypothesis for all of the images that it is tested against.

Elements 315 of evaluation information 307 contain Mindist 317 and clabel 319. Mindist 319 is the minimum distance recorded thus far between the image 417 in training data 411 corresponding to element 315 and any image in the the hypothesis 207 corresponding to hypothesis testing information 303 to which evaluation information 307 belongs and clabel 319 contains the label for the image in hypothesis 207 with the minimum distance. curr_state 431 and best_state 433 each contain an evaluation information entry 315 for each image in training data 411.

Error information 321, finally, contains a sample error element 323 for each of the weak hypotheses 207. Each element 323 contains an image element 325 for each image in the weak hypothesis corresponding to element 323. Image element 325 in turn contains five kinds of error information about its corresponding image:

weighted 419 contains the weighted error for the image;

gbound 421 contains the guaranteed bound on the training error;

aerr 423 contains the actual training error;

gvalerr 425 contains the guaranteed cross-validation error; and avalerr 427 contains the actual cross-validation error.

Detailed Description of the Operation

In the preferred embodiment, each weak hypothesis 207 is constructed by a procedure called WeakLearn. When constructing weak hypothesis 207(0), WeakLearn initializes each Mindist 317 in evaluation information entry 315(0) to a large value; when constructing the ith weak hypothesis 207(i), WeakLearn initializes each Mindist 317 in evaluation information entry 315(i) from Mindist 317 and clabel 319 in weak hypothesis 207(i-1) in a fashion which will be described in detail below.

Then WeakLearn executes a loop which adds training data entries 413 to hypothesis 207(i) until the full number of images (m) in hypothesis 207(i) is reached. For each training data entry 413 added to the hypothesis, WeakLearn does the following:

First, it invokes a function called Filt_ex which selects the next training data entry 413 (j) which is to be a candidate to be added to the weak hypothesis 207(i) under construction. Filt_ex takes as its arguments the size of training data 411 and weight info 305(i-1) for the last hypothesis to be added. Filt_ex uses the total weight for the last hypothesis (in wtsum 313(i,n)) to compute a random number which is in turn used to determine the direction in which each step of a binary search moves to find index j of the next training data entry 413(j). In the preferred embodiment, the computation is the following:

```
/* generate a random number in the range */
/* 0 to total weight */
r=(0.0+random())/MAX_RANDOM*W[size-1].WtSum;

index=size/2-1;
step=size/4;
/* the following loop performs a binary search down
/* to the closest smaller even index */
while(step>0) {
    direction=(W[index].WtSum < r)?1:-1;
    index=index+step*direction;
    step=step/2;
}
```

The effect of the computation is to increase the probability that the candidate training data entry 413(j) will be one for which the last weak hypothesis made a poor prediction. As is apparent from the foregoing, W[index]. Wtsum embodies feedback 213 in the preferred embodiment and Filt_ex embodies filter 203.

Next, WeakLearn computes the error which results when candidate training data entry 413(j) is added to weak hypothesis 207(i) and weak hypothesis 207(i) is tested against training data 411. The first part of the computation is performed by the function Update_NN, which performs the test. The function takes candidate entry 413(j), hypothesis testing information 303(i) for weak hypothesis 207(i), and curr_state 431, which is used to keep track of results during the test.

The test is done by comparing the image in training data entry 413(j) with each image in training data 411 in turn. The result of the comparison is the "distance" between the image in the candidate and the image in training data 411. There is an entry in hypothesis testing information 303(i) and in curr_state 431 for each of the images in training data 411. If the distance resulting from the comparison is less than Mindist 317(i,k) in hypotheses testing information 303(i) for image 417(k) in training data 411 (i.e., if it is better than the result of the best previous comparison of a candidate image with the training data image), clabel 319 in curr_state 431(k) is set to the candidate image's label 415(j) and Mindist 317 in curr_state 431(k) is set to the distance. Otherwise, clabel 319 and Mindist 317 in curr_state 431(k) are set from those fields in hypothesis testing information 303(i) for image 417(k).

After the foregoing has been done for every image in training data 411, clabel 319 in each entry of curr_state 431 is compared with label 415 in the corresponding training date entry 413. If they are different, an error value is increased by the value of wt 311 in the corresponding entry for the image in hypothesis testing information 303(i) for hypothesis 207(i). That error value is then returned by Update_NN. WeakLearn then computes the final error for the candidate by dividing the returned error value by the sum of the weights for the previous hypothesis 207(i−1).

Once candidate 413(j)'s error has been obtained, it is compared with the best error for any candidate to date. If the candidate's error is smaller, the best error is set to the candidate error, the candidate is made the best example 413, curr_state is copied to best state 433, and candidate 413(j) is added to hypothesis 207(i). If the candidate's error is not smaller, the best error, best example 413, and best_state 433 remain unchanged and best example 413 is added to hypothesis 207(i).

That being done, hypothesis testing information 303(i) and sample error 323(i) are updated. First, best_state 433 is copied to eval_info 307(i). Then weighted 419 in image error element 325(i,j) corresponding to hypothesis (i) and candidate image (j) is set from the best error. Next, Update_NN is used to update hypothesis testing information 303(i). The current best example 413 is compared with each image 417(k) in training data 411 and the distance computed. If the computed distance is less than Mindist 317 in evaluation information 315(i,j,k) of hypothesis testing information 303 (i), Mindist 317 is set to that value and clabel 319 in evaluation information 315(i,j,k) is set to the current best example's label. Otherwise, evaluation information 315(i,j,k) is not changed.

Finally, the procedure Calc_errors is invoked to calculate coefficient 405 in weak hypothesis entry 401(i) for the hypothesis with the current best example 413 added to it and to calculate the values in image error entry 325 (i,j,k) for hypothesis 207(i) with the current best example 413 added to it. The calculation which is of interest in the present context is that for coefficient 405. Coefficient 405 is computed from the present value of weighted 419 in image error 325 (i,j,k) as follows: coeff=log((1.0−weighted)/weighted). Thus, in the preferred embodiment, Calc_errors and Update_NN together perform the function of evaluator 209.

After WeakLearn has finished adding images from training data 411 to current hypothesis 207(i) as just described, weight information 305(i+1) in hypothesis testing information 303(i+1) for the next weak hypothesis 207(i+1) is initialized. This is done by taking weighted 419 from image error element 325(i,o,n) corresponding to the test of the last example 413(o) added to hypothesis 207(i) against the last image 417(n) in training data 411 and using weighted 419 to compute a value beta which is weighted/(1—weighted). Then each clabel 319 in eval info 307(i) is compared with label 415 on the corresponding training data entry 413. If they are the same, wt 311 corresponding to training data entry 413 is copied to wt 311 for the corresponding training data tentry 413 in eval info 307(i+1); if they are not the same, wt 311 in eval info 307(i) is multiplied by the value of beta and the result copied to eval info 307(i+1). As wt 311 in each weight information entry 309 is set in eval info 307(i+1), the cumulative wtsum is also set.

In the preferred embodiment, WeakLearn operates as described above for each weak hypothesis 207 in strong hypothesis 217. Once strong hypothesis 217 is finished, it may be used to classify images of the digits 0 through 9.

Using the Invention with Neural Networks

As disclosed in the Drucker reference supra, boosting may also be used to generate hypotheses which are neural networks. Applicants' feedback techniques may of course be used here as well. In such a system, the weak hypotheses generated by learning apparatus 207 are neural networks and strong hypothesis 217 is produced by combining the outputs of the neural networks. As with the preferred embodiment, the last weak hypothesis 207 generated by learning apparatus 217 is evaluated in evaluator 209 against evaluation data 211 and feedback 213 from the test is applied to filter 203 to bias selection of training data from training data 117 towards data which the last weak hypothesis did not successfully classify. The selected training data is then used to train the next neural network weak hypothesis. Further, when evaluator 209 evaluates a neural network weak hypothesis, it provides coefficient 215 for the neural network weak hypothesis, and when the neural network weak hypotheses are combined to form the neural network strong hypothesis, the coefficients determine the weight given to each of the neural network weak hypotheses in the strong hypothesis.

Applications of the Invention

The invention may be employed in several ways to create hypotheses 111 for classifiers. For example, a manufacturer of OCR apparatus such as that shown in FIG. 1 might use an embodiment of the invention to train a strong hypothesis 217 for the OCR apparatus on samples of the kinds of documents that the OCR apparatus would typically be used with. In such a case, the manufacturer of the OCR apparatus could place strong hypothesis 217 in read only memory in the OCR apparatus. In other cases, an embodiment of the invention might be part of the OCR apparatus itself, so that the users of the OCR apparatus could train the OCR apparatus to handle characters which were different from those that the OCR would generally be used with. The characters might merely have different fonts from those generally used, but they might also belong to another language. As is apparent from the foregoing description of the invention, all that is required to produce strong hypothesis 217 is a set of labelled example images.

While the preferred embodiment 201 of the invention is used to classify images of digits, the techniques employed to create strong hypothesis 217 may be used for hypotheses which can be employed in any kind of pattern recognition situation. The hypotheses may be used to classify any kind of data on the basis of bit patterns and may also be used to classify data on the basis of larger-scale patterns such as those made by the occurrences of certain words in texts or of certain values in arrays.

5 CONCLUSION

The foregoing Detailed Description has disclosed to those skilled in the art techniques which may be employed to make strong hypotheses by generating a sequence of weighted weak hypotheses. Fundamental to these techniques is the use of feedback from an evaluation of a weak hypothesis to select patterns to be added to the weak hypothesis and the use of the evaluation to compute a coefficient which indicates the weight to be given to the weak hypothesis when it is employed in a strong hypothesis.

While the embodiment of the invention disclosed herein is the best presently known to the inventors, it is a prototype. As will be immediately apparent to those skilled in the art, the techniques of the invention may be implemented in many ways other than those employed in the prototype. Moreover, any implementation of the invention will necessarily be strongly influenced by the kind of data being classified and by the environment in which the classifier containing the hypothesis must operate.

The above being the case, the foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the law.

What is claimed is:

1. Apparatus for automatically generating a hypothesis to classify a set of examples for pattern recognition, the apparatus comprising:

input means for receiving the set of examples to be classified, the set of examples comprising machine-readable symbols;

learning means for receiving a subset of the set of examples and generating weak hypotheses therefrom;

evaluation means for evaluating the weak hypotheses during generation of the weak hypotheses and providing a selection feedback based on the evaluation, the evaluation means outputting a weighting feedback to the learning means based on the evaluation, the learning means assigning weights to the weak hypotheses in response to the weighting feedback and generating the hypothesis by combining the weak hypotheses according to the weights assigned thereto;

subset selection means responsive to the selection feedback for selecting a next subset of the set of examples; and determination means for classifying the set of examples based on the hypothesis.

2. The apparatus set forth in claim 1 wherein:
   the evaluation means receives evaluation examples of the examples to be classified and evaluates the hypothesis against the evaluation examples.

3. The apparatus set forth in claim 1 wherein:
   the subset selection means responds to the feedback by selecting subsequent examples from the subset such that there is an increased probability that the hypothesis will not correctly classify the subsequent examples at the time the subset selection means selects them.

4. The apparatus set forth in any of claims 1, 2, or 3 wherein:
   the hypothesis includes a plurality of hypothesis examples from the set of examples; and
   the learning means generates the hypothesis by adding selected ones of the hypothesis examples from the subset thereto.

5. The apparatus set forth in claim 4 wherein:
   the evaluation means determines whether addition of each of the examples to the hypothesis improves the hypothesis, and
   the learning means selects the examples to add to the hypothesis which improve the hypothesis.

6. The apparatus set forth in any of claims 1, 2, or 3, further comprising a neural network, and wherein:
   the neural network generates the hypothesis; and
   the learning means trains the neural network on the subset.

7. Apparatus for automatically generating a hypothesis to classify a set of examples of items for pattern recognition, the apparatus comprising:

input means for receiving the set of examples to be classified, the set of examples comprising machine-readable symbols;

learning means for receiving a subset of the set of examples and generating weak hypotheses therefrom;

evaluation means for evaluating the weak hypotheses during generation of the weak hypotheses and providing a weighting feedback based on the evaluation;

means responsive to the weighting feedback for assigning a weight to each of the weak hypotheses;

subset selection means for selecting a next subset of the set of examples; and determination means for classifying the set of examples based on the hypothesis.

8. A method of automatically generating a hypothesis to classify a set of examples for pattern recognition, the method comprising the steps of:

inputting the set of examples to be classified, the set of examples comprising machine-readable symbols;

receiving a subset of the set of examples and generating weak hypotheses therefrom;

evaluating the weak hypotheses during generation of the weak hypotheses and providing a selection feedback based on the evaluation, and outputting a weighting feedback based on the evaluation;

assigning weights to the weak hypotheses in response to the weighting feedback;

generating the hypotheses by combining the weak hypotheses according to the weights assigned thereto;

selecting a next subset in response to the selection feedback; and classifying the set of examples based on the hypotheses.

9. A method of automatically generating a hypothesis to classify a set of examples for pattern recognition, the method comprising the steps of:

inputting the set of examples to be classified, the set of examples comprising machine-readable symbols;

receiving a subset of the set of examples and generating weak hypotheses therefrom;

evaluating the weak hypotheses during generation of the weak hypotheses and providing a weighting feedback based on the evaluation;

assigning a weight to each of the weak hypotheses in response to the weighting feedback;

generating the hypotheses by combining the weak hypotheses according to the weights assigned thereto;

selecting a next subtext; and classifying the set of examples based on the hypothesis.

10. Apparatus for classifying items of data using a hypothesis, the apparatus having the improvement wherein:

the hypothesis is made by the method of claim 8 or the method of claim 9.

11. The apparatus set forth in claim 1 wherein the machine-readable symbols comprise symbols reproduced from pattern-bearing signals or media.

12. The apparatus set forth in claim 11 wherein the examples comprise scanned alphanumeric images, and the classification assigns an alphanumeric character for each image according to the hypothesis.

13. The apparatus set forth in claim 7 wherein the machine-readable symbols comprise symbols reproduced from pattern-bearing signals or media.

14. The apparatus set forth in claim 13 wherein the examples comprise scanned alphanumeric images, and the classification assigns an alphanumeric character for each image according to the hypothesis.

15. The method set forth in claim 8 wherein the machine-readable symbols comprise symbols reproduced from pattern-bearing signals or media.

16. The method set forth in claim 15 further comprising the steps of:

scanning alphanumeric images as the examples; and assigning an alphanumeric character for each image, according to the hypothesis.

17. The method set forth in claim 9 wherein the machine-readable symbols comprise symbols reproduced from pattern-bearing signals or media.

18. The method set forth in claim 17 further comprising the steps of:

scanning alphanumeric images as the examples; and assigning an alphanumeric character for each image, according to the hypothesis.

19. An optical character recognition apparatus, comprising:

optical input means for receiving a set of examples to be classified, the set of examples comprising machine-readable symbols;

processing means, the processing means being programmed to execute character recognition, and comprising;

learning means for receiving a subset of the set of examples and generating weak hypotheses therefrom;

evaluation means for evaluating the weak hypotheses during generation of the weak hypotheses and providing a selection feedback based on the evaluation, and generating a weighting feedback, the evaluation means generating the hypotheses by combining the weak hypotheses according to the weights assigned thereto;

subset selection means responsive to the selection feedback for selecting a next subset of the set of examples; and determination means for classifying the set of examples according to the hypothesis.

20. The apparatus of claim 19 wherein:

the evaluation means receives evaluation examples of the examples to be classified and evaluates the hypothesis against the evaluation examples.

21. The apparatus of claim 20 wherein:

the subset selection means responds to the selection feedback by selecting subsequent examples from the subset such as there is an increased probability that the hypothesis will not correctly classify the subsequent examples at the time the subset selection means selects them.

22. The apparatus of claim 19 wherein:

the hypothesis includes a plurality of hypotheses examples from the subset of the examples; and the learning means generates the hypothesis by adding selected ones of the hypothesis examples from the subset thereto.

23. The apparatus of claim 22 wherein:

the evaluation means determines whether the addition of each of the examples to the hypothesis improves the hypothesis; and the learning means selects the examples to add the hypothesis to improve the hypothesis.

24. The apparatus of claim 19, further comprising memory means, the memory means storing the hypothesis and the set of examples during generation.

25. The apparatus of claim 24, wherein the memory means comprises a read-only memory imbedded in the optical character recognition apparatus; and the read-only memory stores predetermined hypothesis information.

26. The apparatus of claim 19 further comprising a neural network, and wherein:

the neural network generates the hypothesis; and the learning means trains the neural network on the subsets.

\* \* \* \* \*